(12) United States Patent
Ohashi

(10) Patent No.: US 8,819,689 B2
(45) Date of Patent: Aug. 26, 2014

(54) MANAGEMENT APPARATUS FOR MANAGING NETWORK DEVICES, CONTROL METHOD THEREOF, AND RECORDING MEDIUM

(75) Inventor: Toshio Ohashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 13/083,433

(22) Filed: Apr. 8, 2011

(65) Prior Publication Data

US 2011/0258631 A1 Oct. 20, 2011

(30) Foreign Application Priority Data

Apr. 19, 2010 (JP) ................................. 2010-096332

(51) Int. Cl.
*G06F 9/46* (2006.01)
(52) U.S. Cl.
USPC .......................................... 718/102; 718/100
(58) Field of Classification Search
USPC .......................................... 718/100, 101, 102
See application file for complete search history.

(56) References Cited

U.S. PATENT DOCUMENTS

| 6,446,238 B1 * | 9/2002 | Canestaro et al. ............ 714/807 |
| 2003/0212783 A1 | 11/2003 | Sakai | |
| 2006/0143713 A1 * | 6/2006 | Challener et al. ................ 726/24 |
| 2008/0082829 A1 * | 4/2008 | Yoshioka et al. .............. 713/176 |
| 2008/0092235 A1 * | 4/2008 | Comlekoglu ..................... 726/22 |
| 2008/0134337 A1 * | 6/2008 | Crescenzo et al. ............... 726/24 |
| 2010/0125579 A1 * | 5/2010 | Pardoe et al. .................. 707/736 |
| 2011/0219451 A1 * | 9/2011 | McDougal et al. .............. 726/23 |
| 2011/0238983 A1 * | 9/2011 | Lotspiech et al. ............. 713/165 |

FOREIGN PATENT DOCUMENTS

| CN | 101498998 A | 8/2009 |
| JP | 2003-323364 A | 11/2003 |
| JP | 2008-191869 A | 8/2008 |
| WO | WO 2012109640 A2 * | 8/2012 |

\* cited by examiner

*Primary Examiner* — Emerson Puente
*Assistant Examiner* — Willy W Huaracha
(74) *Attorney, Agent, or Firm* — Canon USA, Inc., IP Division

(57) ABSTRACT

A control method including acquiring and storing, when generating a task in which an object and a network device to which to transmit the object are set, information about the object to be processed in the task; detecting, when executing the task, whether information about the object to be processed in the task is changed from the information about the object stored when the task is generated, according to a setting of the task or the object to be processed in the task; cancelling, when it is detected that there is a change in the information about the object, execution of the task; and transmitting, when it is detected that there is no change in the information about the object, the object processed in the task by executing the task.

21 Claims, 13 Drawing Sheets

FIG.3A

TASK TABLE — 300

| TASK ID | TASK NAME | TASK TYPE ID | TIME OF EXECUTION | EXECUTION RESULT |
|---|---|---|---|---|
| 1 | APPLICATION INSTALL TASK 1 | 1 | 2009/12/3 9:00 | SUCCESSFUL |
| 2 | DESTINATION TABLE DISTRIBUTION TASK 1 | 2 | 2010/1/1 0:00 | UNEXECUTED |
| 3 | RESOURCE DISTRIBUTION TASK 1 | 3 | 2009/12/24 23:00 | UNSUCCESSFUL |
| 4 | FIRMWARE INSTALL TASK 1 | 4 | 2009/12/31 18:00 | UNEXECUTED |
| | | | | |

TASK CHANGE DETECTION EXECUTION REFERENCE TABLE — 301

| TASK TYPE ID | EXECUTION OF CHANGE DETECTION NECESSARY |
|---|---|
| 1 | TRUE |
| 2 | FALSE |
| 3 | FALSE |
| 4 | TRUE |
| | |

APPLICATION TABLE — 302

| APPLICATION ID | APPLICATION NAME | PRESENCE OF EULA | HASH VALUE |
|---|---|---|---|
| 1 | APPLICATION 1 | TRUE | 123456789 |
| 2 | APPLICATION 2 | FALSE | — |
| | | | |

TASK OBJECT APPLICATION TABLE — 303

| TASK ID | DEVICE ID | APPLICATION ID | HASH VALUE |
|---|---|---|---|
| 1 | 1 | 1 | 123456789 |
| 1 | 1 | 2 | — |
| | | | |

DEVICE TABLE — 304

| DEVICE ID | DEVICE NAME | MAC ADDRESS | IP ADDRESS |
|---|---|---|---|
| 1 | DEVICE 1 | XX:XX:XX:XX:XX:XX | 172.24.XX.XX |
| 2 | DEVICE 2 | XX:XX:XX:XX:XX:XX | 172.24.XX.XX |
| | | | |

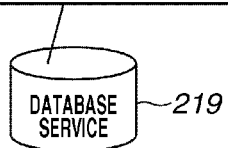

DATABASE SERVICE — 219

FIG.3B

TASK TABLE 300

| TASK ID | TASK NAME | TASK TYPE ID | TIME OF EXECUTION | EXECUTION RESULT |
|---|---|---|---|---|
| 1 | PRINTER DRIVER INSTALL TASK 1 | 1 | 2009/12/3 9:00 | UNEXECUTED |
| 2 | DESTINATION TABLE DISTRIBUTION TASK 1 | 2 | 2010/1/1 0:00 | UNEXECUTED |
| 3 | RESOURCE DISTRIBUTION TASK 1 | 3 | 2009/12/24 23:00 | UNEXECUTED |
| 4 | FIRMWARE INSTALL TASK 1 | 4 | 2009/12/31 18:00 | UNEXECUTED |
| | | | | |

PRINTER DRIVER TABLE 310

| PRINTER DRIVER ID | PDL | VERSION | SUPPORTED OS | LANGUAGE | PRESENCE OF SIGNATURE | PRESENCE OF EULA | HASH VALUE |
|---|---|---|---|---|---|---|---|
| 1 | PS | 1.00 | xxx | JAPANESE | FALSE | TRUE | 123456789 |
| 2 | PCL | 2.00 | xxx | JAPANESE | FALSE | FALSE | 222222222 |
| | | | | | | | |

TASK OBJECT PRINTER DRIVER TABLE 311

| TASK ID | DEVICE ID | CLIENT COMPUTER ID | PRINTER DRIVER ID | EXECUTION OF CHANGE DETECTION NECESSARY | HASH VALUE |
|---|---|---|---|---|---|
| 1 | 1 | 1 | 1 | TRUE | 123456789 |
| 1 | 1 | 1 | 2 | FALSE | — |
| | | | | | |

DEVICE TABLE 304

| DEVICE ID | DEVICE NAME | MAC ADDRESS | IP ADDRESS |
|---|---|---|---|
| 1 | DEVICE 1 | XX:XX:XX:XX:XX:XX | 172.24.XX.XX |
| 2 | DEVICE 2 | XX:XX:XX:XX:XX:XX | 172.24.XX.XX |
| | | | |

CLIENT COMPUTER TABLE 312

| CLIENT COMPUTER ID | CLIENT COMPUTER NAME | MAC ADDRESS | IP ADDRESS |
|---|---|---|---|
| 1 | CLIENT COMPUTER 1 | XX:XX:XX:XX:XX:XX | 172.24.XX.XX |
| 1 | CLIENT COMPUTER 2 | XX:XX:XX:XX:XX:XX | 172.24.XX.XX |
| | | | |

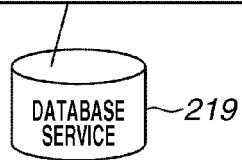

DATABASE SERVICE 219

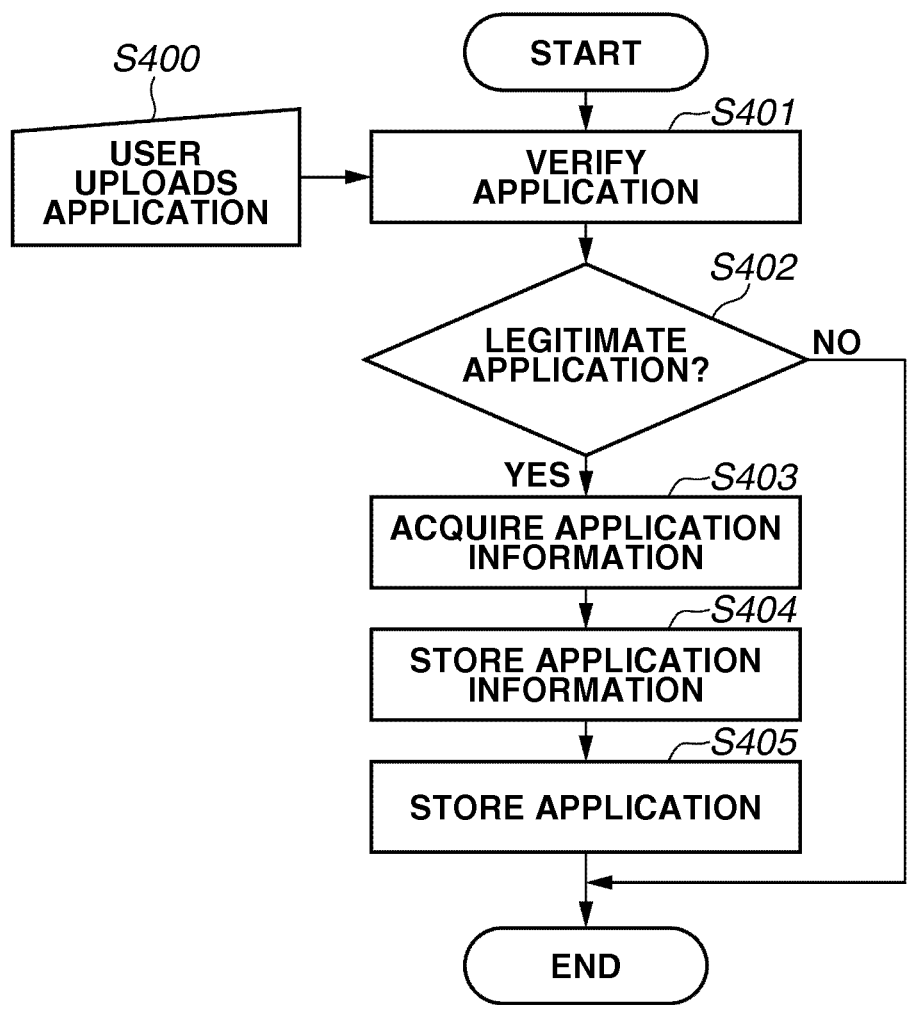

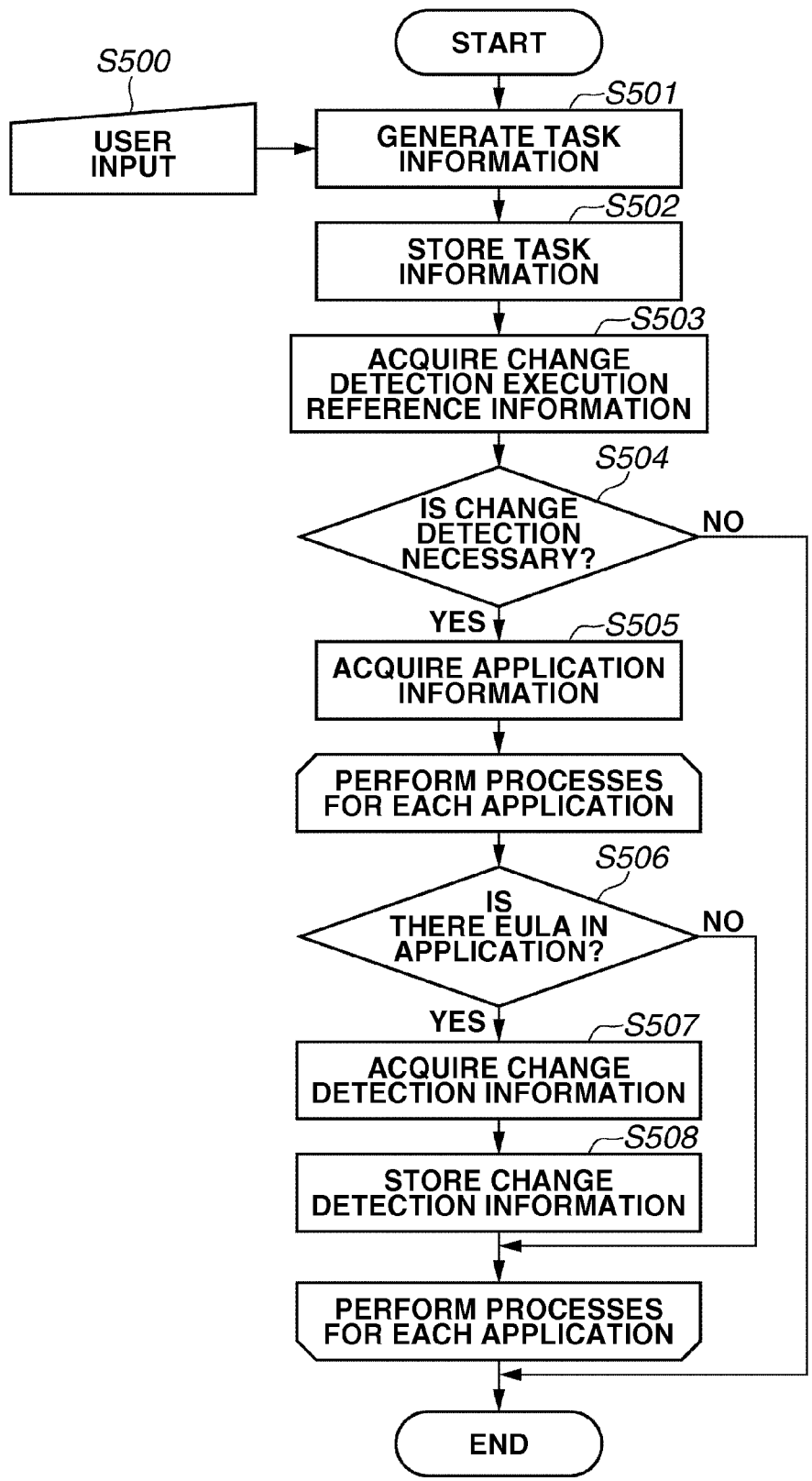

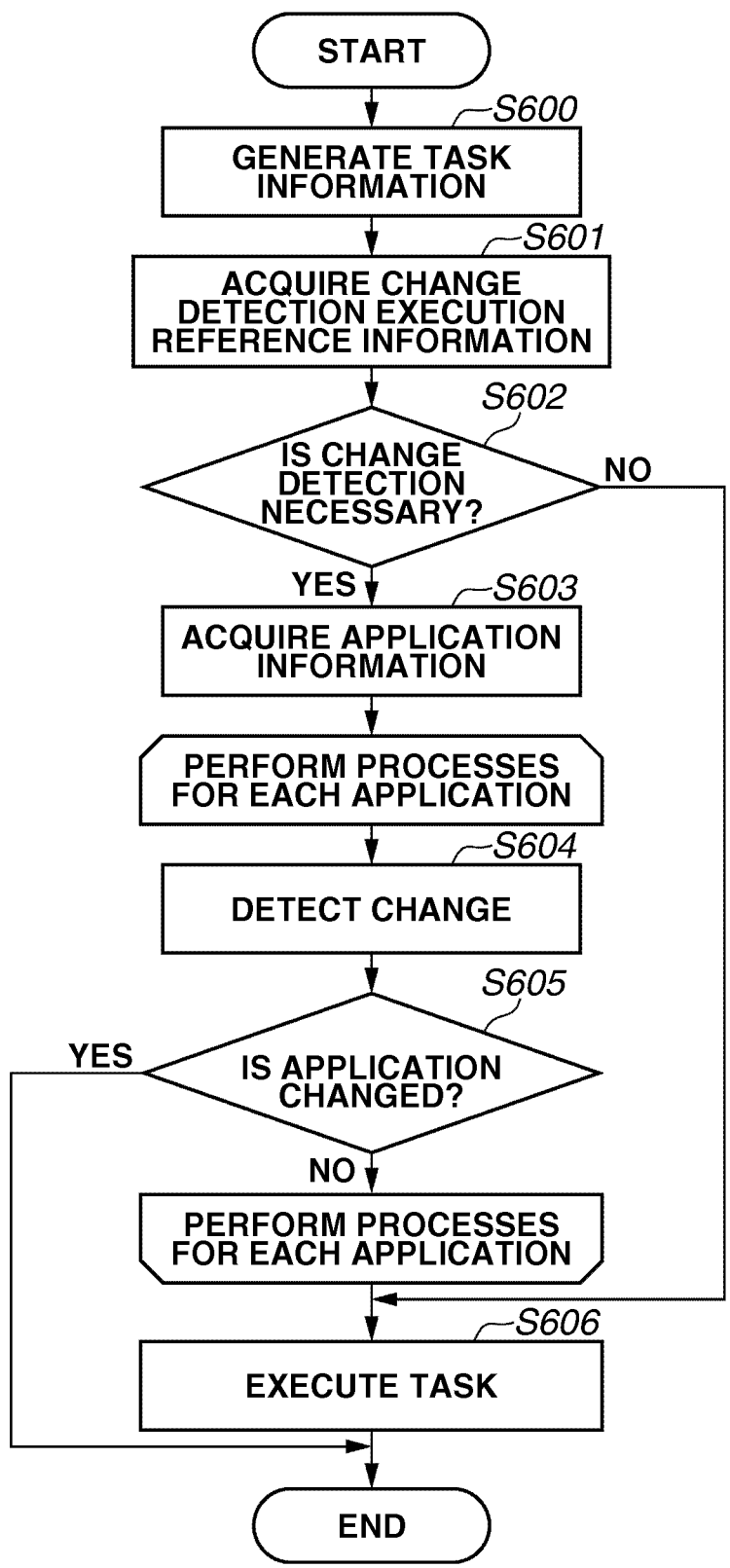

FIG.7

| | APPLICATION NAME | VERSION | | APPLICATION ID |
|---|---|---|---|---|
| ☑ | APPLICATION 1 | 2.00 | UPDATE | 00000000-0000-0000-0000-000000001 |
| ☐ | APPLICATION 2 | 1.00 | | 00000000-0000-0000-0000-000000002 |
| ☐ | APPLICATION 3 | 3.00 | | 00000000-0000-0000-0000-000000003 |

APPLICATION MANAGEMENT: RECOVERY TASK http://172.24.xx.xx/xxx/Plugin/DeviceApplicationManagement/Task.aspx

SELECT APPLICATION  [< BACK] [NEXT >] [CANCEL]

700

701  702  703  704

[< BACK] [NEXT >] [CANCEL]
705   706    707

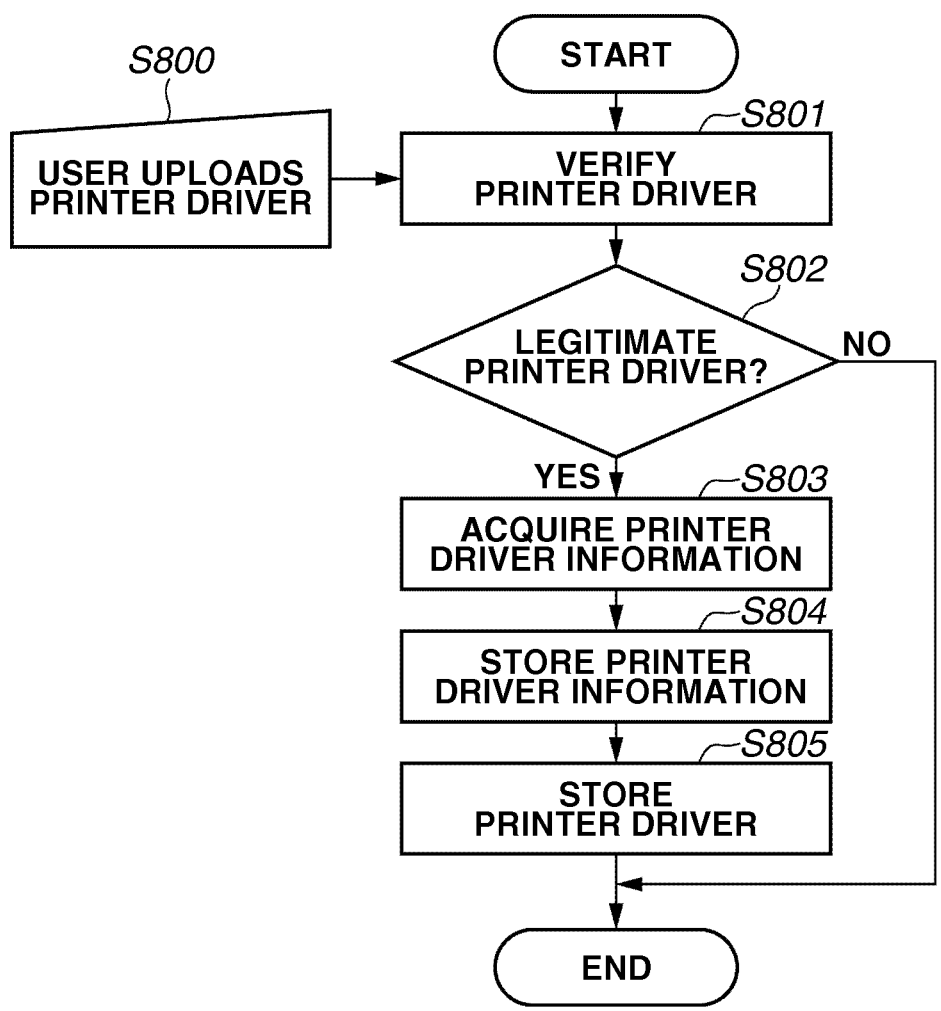

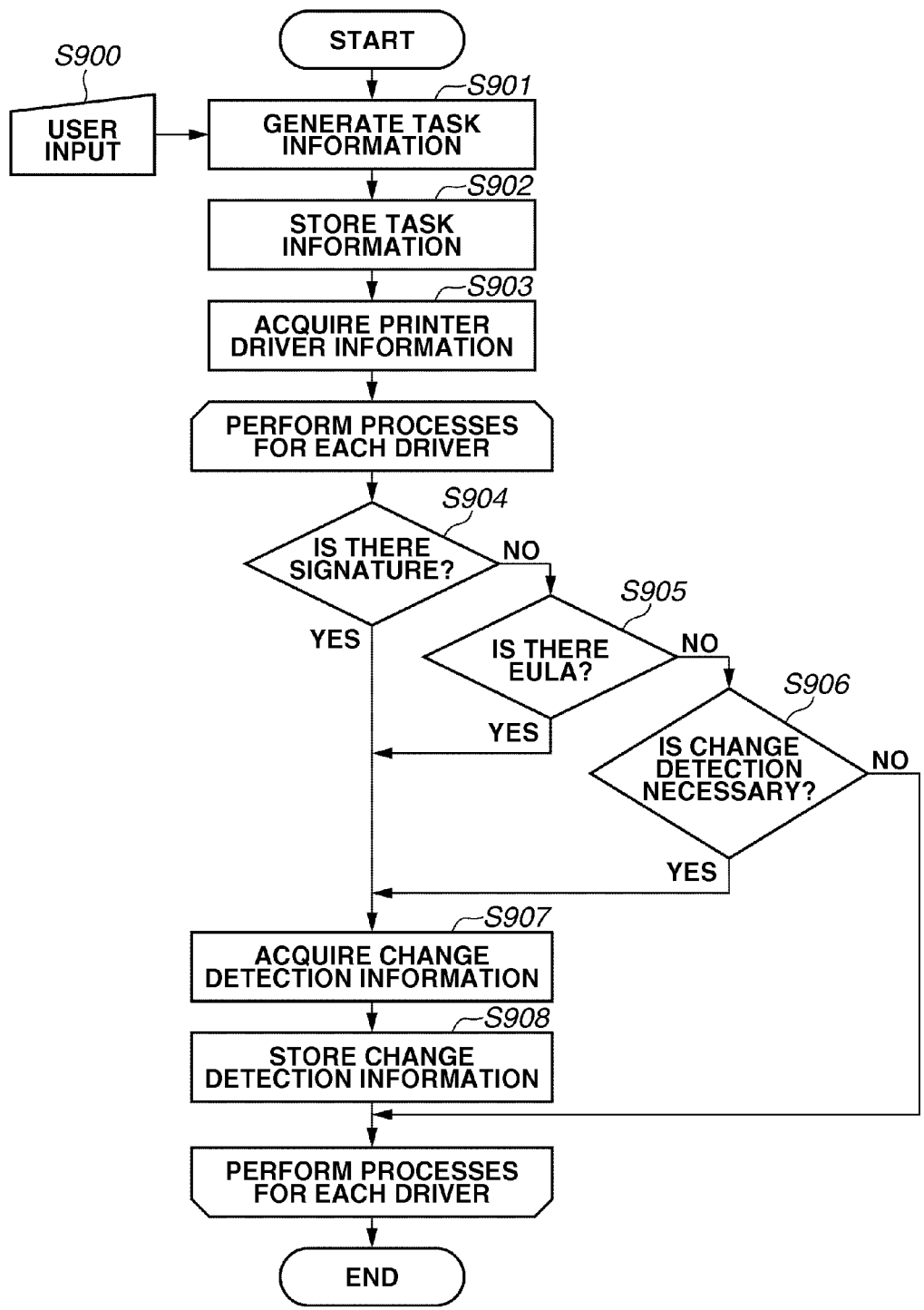

FIG.10

PRINTER DRIVER MANAGEMENT: INSTALL TASK http://172.24.xx.xx/xxx/Plugin/PrinterDriverManagement/InstallTask.aspx

PRINTER DRIVER CHANGE DETECTION SETTING   [< BACK]  [NEXT >]  [CANCEL]

☑ WHEN EXECUTING TASK, CHECK WHETHER PRINTER DRIVER HAS BEEN CHANGED SINCE GENERATING TASK — 1003
○ CHECK ALL PRINTER DRIVERS
◉ CHECK ONLY SELECTED PRINTER DRIVER

| | PDL | VERSION | SUPPORTED OS | LANGUAGE | SIGNATURE | |
|---|---|---|---|---|---|---|
| ☑ | PS | 2.00 | Windows 2000/XP/2003/Vista/2008 | ENGLISH | YES | DISPLAY EULA |
| ☑ | PCL | 10.00 | Windows 2000/XP/2003/Vista/2008 | ENGLISH | NO | DISPLAY EULA |
| ☐ | PS | 1.00 | Windows 2000/XP/2003/Vista/2008 | ENGLISH | NO | DISPLAY EULA |

1004 1005 1006 1007 1008 1009 1010

[< BACK]  [NEXT >]  [CANCEL]
1011  1012  1013

1000 1001 1002

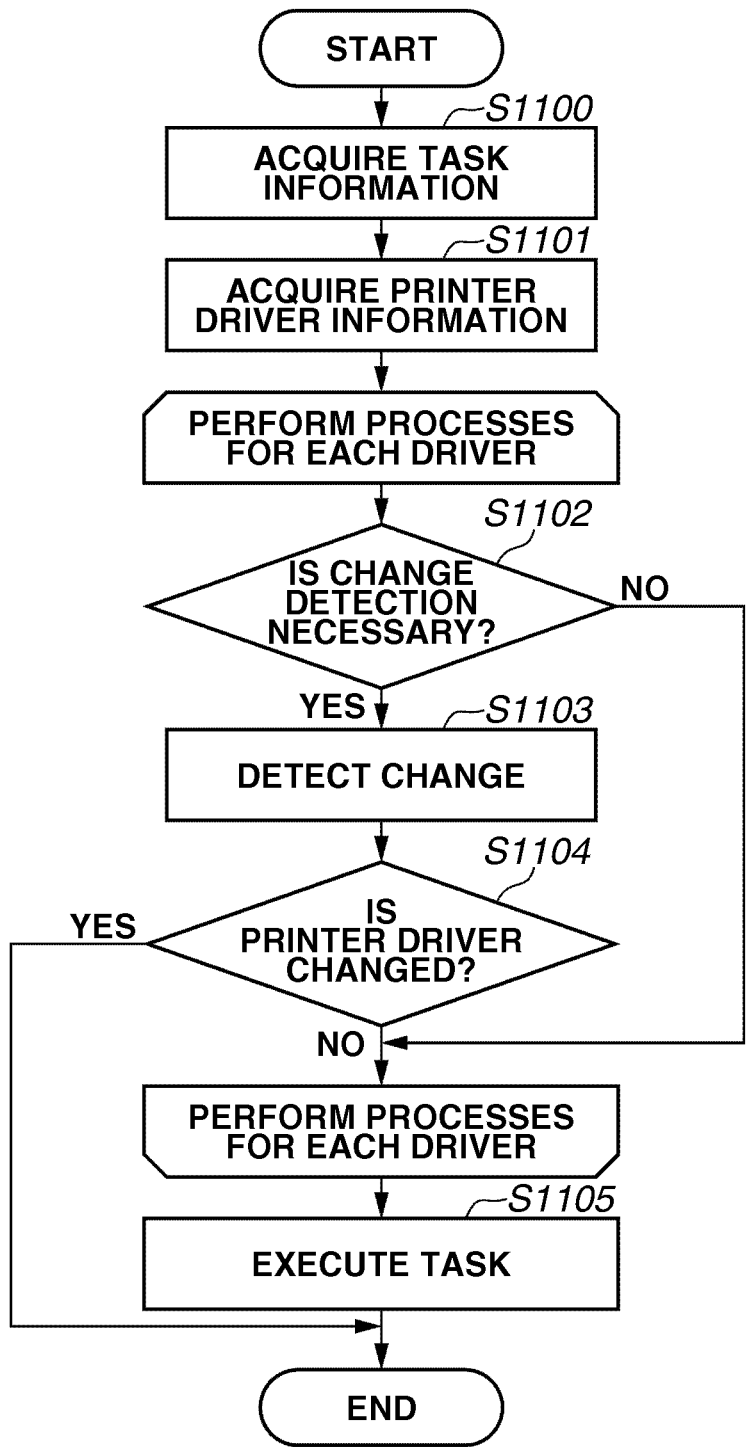

MANAGEMENT APPARATUS FOR MANAGING NETWORK DEVICES, CONTROL METHOD THEREOF, AND RECORDING MEDIUM

BACKGROUND OF THE INVENTION

1. Field of the Invention

The present invention relates to a technique for managing network devices on a network.

2. Description of the Related Art

Conventionally, there has been a management apparatus that manages network devices such as a printer or a multifunction peripheral, and further includes a task function. The task function automatically executes at a designated time, such as at night, a management task (hereinafter referred to as a task) with respect to an object that is arbitrarily selected by a user. More specifically, Japanese Patent Application Laid-Open No. 2003-323364 discusses a task for downloading to the network device, resource data (i.e., an object) selected by the user.

An example of a process performed by the task function employing an object is distribution of the object selected by the user when registering the task. Conventionally, the task is executed as is, even when the object has been changed between registration of the task and execution of the task, so that the newest resource data can be downloaded. However, if the object is changed before executing the task, the object may be processed against the intentions of an administrator when generating and registering the task (e.g., illegal data distribution). Such a case may occur in a portion of the management tasks to be performed with respect to the network devices.

SUMMARY OF THE INVENTION

According to an aspect of the present invention, a management apparatus includes a storing unit configured to acquire and store, when generating a task in which an object and a network device to which to transmit the object are set, information about the object to be processed in the task, a detection unit configured to detect, when executing the task, whether information about the object to be processed in the task is changed from the information about the object stored in the storing unit when the task is generated, according to a setting of the task or the object to be processed in the task, a cancelling unit configured to cancel, when the detection unit detects that there is a change in the information about the object, execution of the task, and a transmission unit configured to transmit, when the detection unit detects that there is no change in the information about the object, the object to be processed in the task by executing the task.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are block diagrams illustrating table configurations in a database service according to the first and second exemplary embodiments of the present invention, respectively.

FIG. 4 is a flowchart illustrating an application registration process according to the first exemplary embodiment of the present invention.

FIG. 5 is a flowchart illustrating a task generation process according to the first exemplary embodiment of the present invention.

FIG. 6 is a flowchart illustrating a task execution process according to the first exemplary embodiment of the present invention.

FIG. 7 illustrates an example of a recovery task screen according to the first exemplary embodiment of the present invention.

FIG. 8 is a flowchart illustrating a printer driver registration process according to the second exemplary embodiment of the present invention.

FIG. 9 is a flowchart illustrating a task generation process according to the second exemplary embodiment of the present invention.

FIG. 10 illustrates an example of a task generation screen according to the second exemplary embodiment of the present invention.

FIG. 11 is a flowchart illustrating a task execution process according to the second exemplary embodiment of the present invention.

DESCRIPTION OF THE EMBODIMENTS

Various exemplary embodiments, features, and aspects of the invention will be described in detail below with reference to the drawings.

An application server, i.e., a management apparatus, according to the first exemplary embodiment of the present invention will be described below. According to the present exemplary embodiment, a multifunction peripheral (MFP) 150 is an example of a network device to be managed. The network device includes a client computer, a printer including the MFP, and an image forming apparatus such as a facsimile machine.

Figure 1:
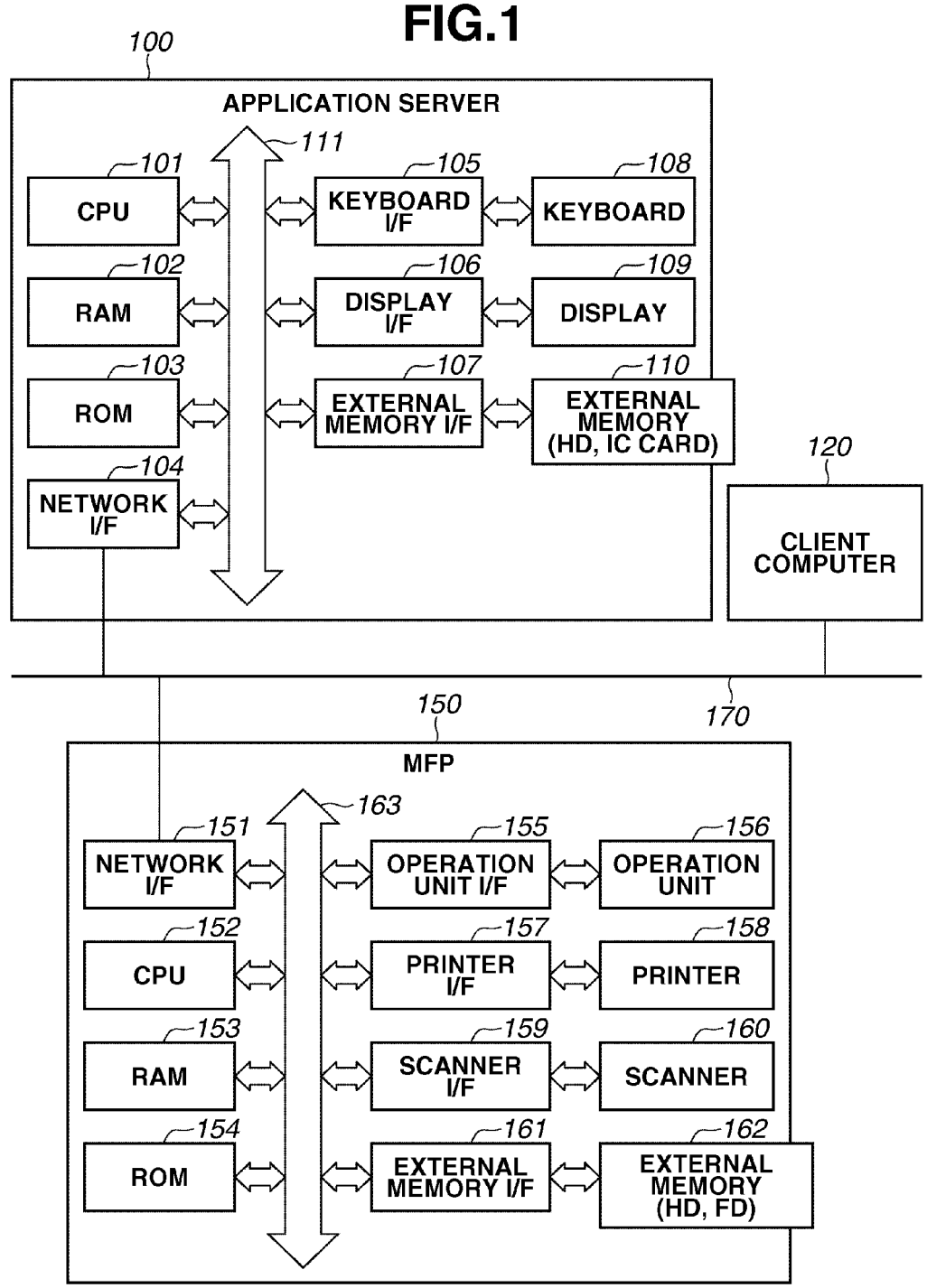
FIG. 1 is a block diagram illustrating a system configuration and a hardware configuration according to an exemplary embodiment of the present invention.

FIG. 1 is a block diagram illustrating a system configuration and a hardware configuration of a network device management system including the application server according to the present exemplary embodiment. Referring to FIG. 1, the network device management system includes an application server 100, a client computer 120, and the MFP 150, which are connected by a network 170. The application server 100 and the client computer 120 are general-purpose computers. Since the hardware configuration of the client computer 120 is similar to that of the application server 100, description will be omitted.

The application server 100 includes a central processing unit (CPU) 101 that executes processes based on application programs stored in a read-only memory (ROM) 103 or an external memory 110. The CPU 101 also collectively controls each of the devices connected to a system bus 111. Further, the CPU 101 opens various windows registered based on a command instructed by the user using a mouse cursor (not illustrated) on a display 109, and executes data processing. A random access memory (RAM) 102 functions as a main memory and a work area for the CPU 101. The ROM 103 is a read-only memory that functions as a storage area of a basic input/output (I/O) program. The ROM 103 or the external memory 110 stores an operating program (OS) that is the control program of the CPU 101, files that are used when processes are performed based on the application programs, and various data.

A network interface (I/F) 104 connects to a network 170 and performs network communication. A keyboard I/F 105 controls input from a keyboard 108 or a pointing device (not illustrated). A display I/F 106 controls displaying on the display 109. An external memory I/F 107 controls access to the external memory 110, e.g., a hard disk (HD) or a floppy disk (FD). The external memory 110 stores a boot program, various applications, user files, and an edit file.

The application server 100 operates while the CPU 101 is executing the basic I/O program and the OS written in the ROM 103 or the external memory 110. The basic I/O program is written in the ROM 103, and the OS is written in the ROM 103 or the external memory 110. When the user switches on the computer, an initial program load function in the basic I/O program causes the OS to be written from the ROM 103 or the external memory 110 onto the RAM 102. The system bus 111 connects each of the devices.

The MFP 150 includes a network I/F 151 that connects to the network 170 and performs network communication. A CPU 152 outputs, based on the control program, an image signal as output information to a printer 158 via a printer I/F 157 connected to a system bus 163. The control program is stored in a ROM 154 or an external memory 162. The CPU 152 is capable of communicating with the computer via the network I/F 151 and notifying the application server 100 of information in the MFP 150. Further, the CPU 152 performs a process based on the application programs stored in a ROM 154 or an external memory 162. A RAM 153 functions as a main memory and a work area of the CPU 152, and the memory capacity can be expanded by an option RAM connected to an expansion port. The RAM 153 is used as an output information expansion area, an environment data storage area, and a non-volatile RAM (NVRAM). The ROM 154 or the external memory 162, such as an HD, stores the control program executed by the CPU 152, or font data used when generating the above-described output information, and the information used in the MFP 150.

An operation unit I/F 155 is an interface to an operation unit 156 and outputs image data to be displayed to the operation unit 156. Further, the operation unit I/F 155 receives information input by the user via the operation unit 156. The operation unit 156 is an operation panel on which switches and light emitting diode (LED) indicators are disposed for the user to operate the MFP 150. A printer I/F 157 outputs image signals, i.e., output information, to a printer 158 (i.e., a printer engine). A scanner I/F 159 receives image signals, i.e., input information, from a scanner 160 (i.e., a scanner engine). An external memory I/F 161 (i.e., a memory controller) controls access to the external memory 162 such as an HD or an integrated chip (IC) card. The number of external memories is not limited to one and may be one or more. More specifically, an option font card other than internal font, and a plurality of external memories storing programs for interpreting printer control languages of a different language system may be connected. Further, the MFP 150 may include a NVRAM (not illustrated) that stores printer mode setting information received from the operation unit 156. The system bus 163 connects each of the devices.

Figure 2A:
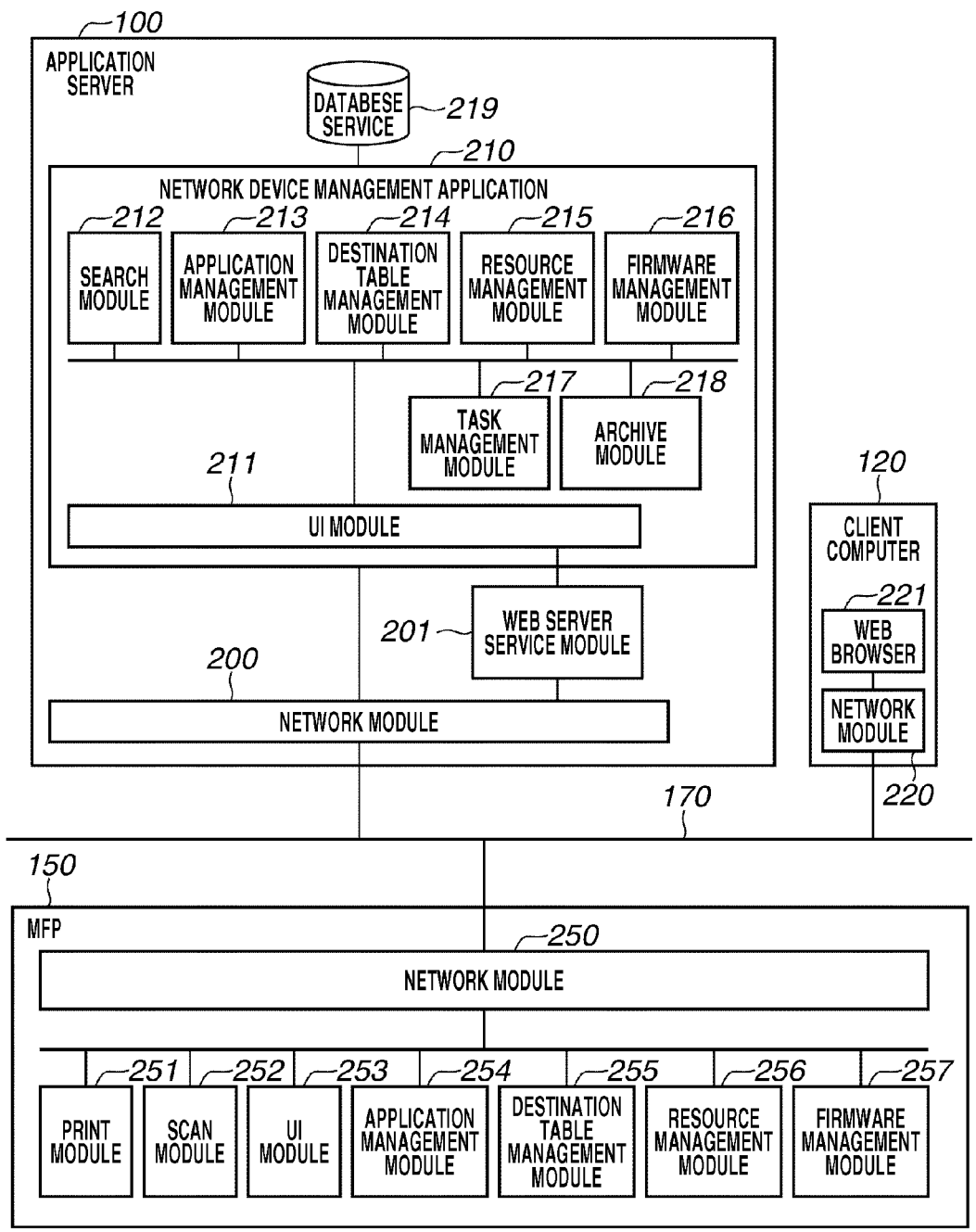
FIGS. 2A and 2B are block diagrams illustrating application configurations according to first and second exemplary embodiments of the present invention, respectively.

FIG. 2A is a block diagram illustrating an application configuration of the network device management system including the application server according to the present exemplary embodiment.

Referring to FIG. 2A, the application server 100 includes a network module 200, a web server service module 201, and a network device management application 210, which are stored as files in the external memory 110. The network module 200, the web server service module 201, and the network device management application 210 are program modules that are loaded to the RAM 102 and executed by the OS or a module which is to use such program modules. Further, the network device management application 210 may be added to the FD or a compact disk (CD)-ROM (not illustrated) in the external memory 110 or the HD in the external memory 110 via the network 170.

The network module 200 uses an arbitrary communication protocol to communicate with the client computer 120 and the MFP 150 on the network. The web server service module 201 provides a service that returns, when receiving a hypertext transfer protocol (HTTP) request from a web browser 221 in the client computer 120, an HTTP response. An example of the HTTP response to be returned is web page data stored in the external memory 110. Further, the web server service module 201 may request a user interface (UI) module 211 in the network device management application 210 to generate the HTTP response.

The network device management application 210 is installed as a program that executes a process in response to a request issued to the web page provided by the web server service module 201. As described above, the network device management application 210 along with the web server service module 201 realizes a web application for managing the MFP 150.

The network device management application 210 includes the UI module 211 that generates the HTTP response according to the request from the web server service module 201. The UI module 211 receives the input information transmitted from the web browser 221 in the client computer 120, and transmits the input information to each module as necessary. A search module 212, an application management module 213, a destination table management module 214, a resource management module 215, and a firmware management module 216 in the network device management application 210 are examples of the modules that are called when the application server 100 executes the task. Other modules may also be called to execute the task. Each module stores in a database service 219, task information input by the user. Examples of the task information that is necessary for executing the task are a task type, execution time of the task, and information about the MFP 150 to which the task is to be executed.

A task management module 217 in the network device management application 210 manages the tasks for managing the MFP 150. The task management module 217 regularly refers to the database service 219 and confirms whether there is a task to be executed. If there is a task whose execution time has elapsed, the task management module 217 calls the necessary module based on information about the task and executes the task. If the called module then completes the process, the task management module 217 stores a task execution result in the database service 219.

For example, if the task for searching the MFP 150 on the network is stored in the database service 219, the task management module 217 calls the search module 212 and executes the task. Upon completing the process for searching the MFP 150, the search module 212 stores in the database service 219 the information such as a search result as the task execution result.

Further, if the task for distributing an application to the MFP 150 is stored in the database service 219, the task management module 217 calls the application management module 213 and executes the task. Upon completing the process for distributing the application to the MFP 150, the application management module 213 stores in the database service 219 the information such as a distribution result as the task execution result.

Furthermore, if the task for distributing a destination table to the MFP 150 is stored in the database service 219, the task management module 217 calls the destination table management module 214 and executes the task. The destination table includes destination data used by the MFP 150, such as an e-mail address and a facsimile number. Upon completing the process for distributing the destination table to the MFP 150, the destination table management module 214 stores in the database service 219 the information such as the distribution result as the task execution result.

Moreover, if the task for distributing a resource file to the MFP 150 is stored in the database service 219, the task management module 217 calls the resource management module 215 and executes the task. The resource file includes a font file, a macro file, and a color profile, to be used in the MFP 150. Upon completing the process for distributing the resource file to the MFP 150, the resource file management module 215 stores in the database service 219 the information such as the distribution result as the task execution result.

Further, if the task for distributing firmware to the MFP 150 is stored in the database service 219, the task management module 217 calls the firmware management module 216 and executes the task. Upon completing the process for distributing the firmware to the MFP 150, the firmware management module 216 stores in the database service 219 the information such as the distribution result as the task execution result.

An archive module 218 in the network device management application 210 archives the files such as an application file and the resource file, and retrieves the archived files, according to the request from each module. The database service 219 which manages the data stores and retrieves the data according to the request from other modules. The database service 219 may be included in a device other than the application server 100 that is accessible from the network device management application 210.

FIG. 3A illustrates an example of a table configuration in the database service 219 illustrated in FIG. 2A. Referring to FIG. 3A, a task table 300 stores a task identification (ID) that uniquely identifies the task, a task name, a task type ID that indicate a type of the task, the time of execution, and the execution result (status). The task information stored in the task table 300 is provided to the user via the client computer as will be described below.

A task change detection execution reference table 301 stores the task type ID that indicates the type of the task, and information on whether it is necessary to detect the change. According to the task change detection execution reference table 301 illustrated in FIG. 3A, a setting is specified so that it is necessary to detect a change in the object (e.g., the application file) when an application install task is executed. On the other hand, it is not necessary to detect a change in the object (e.g., the destination table or the resource file) when the task for distributing the destination table or the resource is executed. In general, the use of such data is not greatly dependent on environment information, such as the firmware of the network device. Further, the destination table and the resource are frequently updated, so that it becomes necessary to distribute the newest destination table and resource file, and detection of the change thus becomes unnecessary.

An application table 302 stores an application ID, an application name, information on whether there is an end-user license agreement (EULA) of the application, and a hash value of the application. A task object application table 303 stores a task ID, a device ID that uniquely identifies the device to which the object is to be distributed, the application ID, and the hash value of the application when the task is generated. A device table 304 stores the device ID that uniquely identifies the device, the device name, a media access control (MAC) address, and an internet protocol (IP) address.

Returning to FIG. 2A, the client computer 120 includes the web browser 221. The user accesses the application server 100 from the client computer 120 via the web browser 221. The web browser 221 exists as a file stored in the ROM 103 or the external memory 110, and is a program module that is loaded to the RAM 102 and executed by the OS or the module that is using the web browser 221. The web browser 221 transmits an HTTP request message to the application server 100 via the network module 220, and receives and displays an HTTP response message returned from the application server 100. The user can thus confirm generation of the task or an execution status of each generated task (e.g., successful, failed, or unexecuted) via the web browser 221.

Each of the modules in the MFP 150 to be described below exists as a file stored in the ROM 154 or the external memory 162 illustrated in FIG. 1. A network module 250 communicates with the application server 100 and the client computer 120 on the network, using an arbitrary communication protocol. A print module 251 receives a print job from the network module 250 and performs printing. A scan module 252 receives the image signal from the scanner I/F 159 and performs scanning. A UI module 253 displays the image data on the operation unit 156 via the operation unit I/F 155. Further, the UI module 253 receives via the operation unit I/F 155 the information input by the user to the operation unit 156 and transmits the information to the CPU.

An application management module 254 manages the applications to be installed to the MFP 150. The application management module 254 receives the application transmitted from the network module 250 and verifies whether the application can be installed. If the application can be installed, the application management module 254 installs the application. A destination table management module 255 manages the destination table used in the MFP 150. The destination table management module 255 receives and verifies the destination table data transmitted from the network module 250, and stores the destination table data as the destination table that can be used in the MFP 150. A resource management module 256 manages the resource files, such as the font file, the macro file, and the color profile, to be used in the MFP 150. A firmware management module 257 installs the firmware in the MFP 150.

An operation performed by the application server 100 when the user registers the application file to the application server 100 will be described below with reference to FIG. 4.

In step S400, the user selects the application file to be registered and instructs the application server 100 to transmit the application file. The user accesses the application server 100 using the web browser 221 on the client computer 120. The UI module 211 in the application server 100 then receives the transmitted application file and calls the application management module 213.

In step S401, the application management module 213 verifies the received application file. The application may be verified by, for example, unzipping the application file and checking a folder configuration or a file extension included in the application file. The method for verifying the application may be any method as long as the application file can be confirmed as a legitimate application. In step S402, the application management module 213 determines whether the application file is a legitimate file, base on the verification result acquired in step S401. If the application file is not a legitimate file (NO in step S402), the process ends. On the other hand, if the application file is a legitimate file (YES in step S402), the process proceeds to step S403.

In step S403, the application management module 213 acquires application information from the application. Examples of the application information to be acquired are the application name, whether the EULA exists, and the hash value of the application. In step S404, the application management module 213 stores the application information acquired in step S403 in the application table 302 of the database service 219. When storing the application information, the application management module 213 sets an arbitrary value to the application ID for uniquely identifying the application. In step S405, the application management module 213 stores the application file via the archive module 218.

An operation performed by the application server 100 when generating a task for transmitting an object, such as installing software or distributing information, will be described below with reference to FIG. 5. The operation performed by the application server 100 when generating a task for the user to install the application to the MFP 150 will be described below as an example. A similar operation is performed in a case where a task is generated for distributing the destination table or a resource (e.g., a font), or installing the firmware to the MFP 150.

In step S500, the user inputs the information necessary for generating the task. More specifically, the user may access the application server 100 using the web browser 221 on the client computer 120, and the information input by the user is then transmitted to the application server 100. The UI module 211 receiving the transmitted input information then calls the application management module 213.

In step S501, the application management module 213 generates the task information based on the received input information. The task information includes the information about execution of the task, such as the task type and the execution time of the task, and information about the target device (e.g., the MFP 150) and the application to be installed. The task type, such as the task ID, may be any information as long as it can uniquely identify each of the tasks that perform different processing. Further, the execution time of the task may be set so that the task is repeatedly executed at a predetermined time interval, i.e., the task is periodically executed. In step S502, the application management module 213 stores the task information generated in step S501 in the task table 300 and the task object application table 303 in the database service 219.

In step S503, the application management module 213 acquires from the task change detection execution reference table 301 in the database service 219, the change detection execution reference information. According to the present exemplary embodiment, the application management module 213 acquires the change detection execution reference information stored in the database service 219. However, any method may be performed as long as information for determining whether to detect the change for each task can be acquired. For example, whether to detect the change may be determined by checking, when executing the task, the application file on whether the application to be installed includes the EULA or the signature information. In step S504, the application management module 213 determines whether it is necessary to detect the change when executing the task, based on the acquired change detection execution reference information. If it is necessary to detect the change (YES in step S504), the process proceeds to step S505. If it is not necessary to detect the change (NO in step S504), the task generation process ends.

In step S505, the application management module 213 acquires from the task object application table 303 in the database service 219, the information about the application that is to be installed by executing the task. The application management module 213 then performs the processes of step S506 to step S508 for each application. In step S506, the application management module 213 determines whether the application includes the EULA, based on the application information acquired in step S505. If the application includes the EULA (YES in step S506), the process proceeds to step S507. If the application does not include the EULA (NO in step S506), the application management module 213 performs the process of step S506 for the next application.

In step S507, the application management module 213 acquires from the application stored in the archive module 218, change detection information. According to the present exemplary embodiment, the hash value of the application file is acquired as the change detection information. The change detection information may be any information as long as it is detectable that the application has been changed, such as the hash value of the EULA included in the application or a time stamp of the application file. In step S508, the application management module 213 stores the hash value of the application acquired in step S507 in the task object application table 303 in the database service 219. After the processes of step S506 to step S508 have been performed for all applications that are the objects of the task to be generated, the operation performed by the application server 100 illustrated in FIG. 5 ends.

An operation performed by the application server 100 when the application server 100 executes a previously registered task will be described below with reference to FIG. 6. According to the present exemplary embodiment, the task for installing an application to the MFP 150 will be described below as an example of the task to be executed by the application server 100. The similar operation is performed when executing a task for distributing the destination table or a resource, or installing the firmware to the MFP 150.

In step 600, the task management module 217 in the application server 100 acquires from the task table 300 in the database service 219, the task information about the application install task. In step S601, the application management module 213 acquires from the task change detection execution reference table 301 in the database service 219, the change detection execution reference information. In step S602, the application management module 213 determines whether it is necessary to detect the change, based on the acquired change detection execution reference information. If it is necessary to detect the change (YES in step S602), the process proceeds to step S603. If it is not necessary to detect the change (NO in step S602), the process proceeds to step S606.

In step S603, the application management module 213 acquires from the task object application table 303 in the database service 219, the information about the application to be installed when executing the task. The application management module 213 then performs the processes of step S604 and step S605 for each application. In step S604, the application management module 213 detects whether the application has been changed, based on the application information acquired in step S603. The detection is performed, for example, by comparing the hash value of the application when generating the task acquired in step S603, with the hash value of the application stored in the application table 302 when executing the task. Any other method may be performed as long as whether the application has been changed can be detected. In step S605, the application management module 213 determines whether the application has been changed, based on the detection result acquired in step S604. If the application has been a changed (YES in step S605), the process ends without executing the task.

The application may be changed from when generating the task to executing the task in a case where the application file archived in the archive module 218 is altered or destructed, or updated due to a version upgrading of the application. For example, when the application is upgraded, it may become necessary to update the firmware of the device or to re-obtain the EULA. In such a case, it may not be desirable to execute the task based on the setting specified when generating the task. To solve such a problem, control may be diverged, so that if the application file is altered or destructed, the task is disrupted, and if the application is upgraded, the task is executed. If the task execution is cancelled, the application management module 213 may generate a recovery task, and the task may be easily re-executed by the user re-editing the task information. For example, if the task execution is disrupted by updating due to the version upgrading of the application, a recovery task editing screen may display a notification that the application has been upgraded. FIG. 7 illustrates an example of a screen displaying the version upgrading of the application on the recovery task editing screen displayed on the web browser 221 in the client computer 120. FIG. 7 will be described in detail below.

On the other hand, if it is determined that the printer driver has not been changed (NO in step S605), the application management module 213 performs the process of step S604 for the next application. After the processes of step S604 and step S605 are performed for all applications, the process proceeds to step S606. In step S606, the application management module 213 acquires the application file archived via the archive module 218. The application management module 213 then executes the task for installing the acquired application to the MFP 150. According to the present exemplary embodiment, the application file and an install instruction are transmitted, based on the task setting (e.g., the target device) generated in FIG. 5.

An example of the screen displayed in response to the process performed in step S605 illustrated in FIG. 6 will be described in detail below with reference to FIG. 7. Referring to FIG. 7, a list of applications to be installed 700 displays information about the applications to be installed when performing the recovery task. More specifically, the list of applications to be installed 700 may display an installing application selection check box 701, an application name column 702, an application version column 703, and an application ID column 704.

The installing application selection check box 701 of an application that had been selected in a cancelled task is also selected by default in the recovery task. An upgraded application is indicated as having been upgraded in the application version column 703. If the user selects the upgraded application to be an object to be installed in the recovery task, the screen may display the EULA and request the user to re-agree. Further, if the user clicks a back button 705, the screen shifts to a screen indicating a step immediately before editing the recovery task. If the user clicks a next button 706, the screen shifts to a screen indicating a step immediately after editing the recovery task. If the user presses a cancel button 707, editing of the recovery task ends.

As a result of performing the above-described processes, the MFP 150 can switch between detecting or not detecting the change in the object when executing the task and determining whether to execute the task, according to the task type. More specifically, when the MFP 150 is to perform the application install task, the task may be performed after determining whether to perform the task based on detection of the change in the application when executing the task. It thus prevents execution of the task for installing a changed application in the MFP 150.

The first exemplary embodiment has been described with respect to a method for determining whether to execute the task by detecting the change in the object when executing the task, according to the task type. The task for installing an application from the application server 100 to the MFP 150 has been described as an example of such a method.

The second exemplary embodiment of the present invention is described with respect to a method for determining whether to execute the task by detecting the change in the object when executing the task, according to the object used when executing the task, instead of the task type. An example of the task according to the second exemplary embodiment is a task for installing from the application server 100 to the client computer 120, a printer driver necessary for printing on the MFP 150. Further, an example in which the user is caused to select, when generating the task, whether to detect the change when executing the task, will also be described below.

Since the system configuration and the hardware configuration of the network device management system including the application server according to the present exemplary embodiment are similar to those according to the first exemplary embodiment illustrated in FIG. 1, description will be omitted.

Figure 2B:
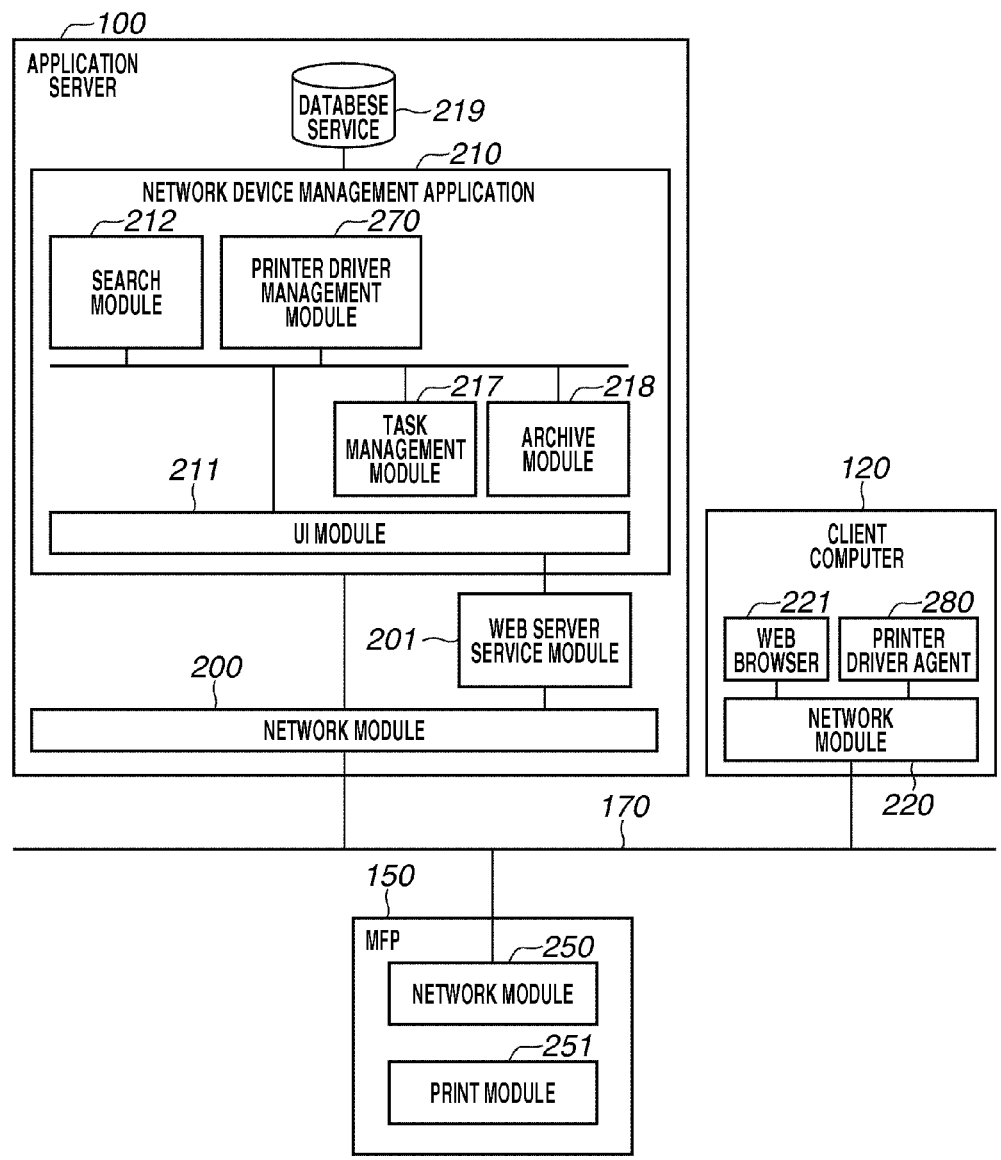

FIG. 2B is a block diagram illustrating an application configuration of the network device management system, including the application server, according to the present exemplary embodiment. Description of the modules that are similar to those according to the first exemplary embodiment illustrated in FIG. 2A will be omitted.

Referring to FIG. 2B, a printer driver management module 270 in the application server 100 manages the printer driver necessary for the client computer 120 to print using the MFP 150. Further, the printer driver management module 270 is called by the task management module 217 when executing the task for installing the printer driver to the client computer 120.

A printer driver agent 280 in the client computer 120 is a program module that exists as a file stored in the ROM 103 or the external memory 110, and is loaded to the RAM 102 and executed by the OS or the module using the printer driver agent 280. The printer driver agent 280 performs bi-directional communication with the application server 100 via the network module 220. More specifically, the printer driver agent 280 may receive the instruction from the printer driver management module 270 in the application server 100 via the network module 220. The printer driver agent 280 then acquires the printer driver from the printer driver management module 270 in the application server 100 and installs the printer driver to the client computer 120.

An example of a table configuration in the database service 219 will be described below with reference to FIG. 3B. Description on the tables which are similar to those according to the first exemplary embodiment illustrated in FIG. 3A will be omitted. Further, the table configuration illustrated in FIG. 3B is an example, and the table configuration may be different according to the present exemplary embodiment.

Referring to FIG. 3B, a printer driver table 310 stores information about a printer driver ID, a page-description language (PDL), a version of the printer driver, a supported OS, language, whether the signature and the EULA exist, and a hash value of the printer driver file. The printer driver ID is an ID for uniquely identifying the printer driver. A task object printer driver table 311 stores a task ID, an ID of a device to which the task is to be executed, a client computer ID, a printer driver ID, information on whether it is necessary to detect a change, and the hash value of the printer driver file when the task is generated. A client computer table 312 stores the client computer ID that uniquely identifies the client computer 120, a client computer name, the MAC address, and the IP address.

According to the first exemplary embodiment, the task change detection execution reference table 301 stores for each task type, the information on whether it is necessary to detect the change. According to the present exemplary embodiment, the printer driver table 311 stores for each printer driver, the information on whether it is necessary to detect the change. In other words, whether it is necessary to detect the change can be determined for each object to be processed in the task (e.g., the printer driver) according to the second exemplary embodiment, which is different from the first exemplary embodiment.

An operation performed by the application server 100 when the user registers the printer driver file to the application server 100 will be described below with reference to FIG. 8.

In step S800, the user accesses the application server 100 using the web browser 221 in the client computer 120, selects the printer driver file to be registered, and transmits the selected printer driver file to the application server 100. Upon receiving the application file transmitted from the user, the UI module 211 calls the printer driver management module 270.

In step S801, the printer driver management module 270 verifies the received printer driver file. The printer driver file may be verified by, for example, checking the signature or the content of the file, or checking the file extension. The method for verifying the printer driver file may be any method as long as the printer driver file can be confirmed to be a legitimate printer driver. In step S802, the printer driver management module 270 determines whether the printer driver file is legitimate, based on the verification result acquired in step S801. If the printer driver is legitimate (YES in step S802), the process proceeds to step S803. On the other hand, if the printer driver is not legitimate (NO in step S802), the process ends.

In step S803, the printer driver management module 270 acquires the printer driver information from the printer driver file. Examples of the printer driver information to be acquired are the printer driver name and version. In step S804, the printer driver management module 270 stores the acquired printer driver information in the printer driver table 310 in the database service 219. In step S805, the printer driver management module 270 stores the printer driver file via the archive module 218.

The operation performed by the application server 100 when the user generates a task for installing the printer driver in the client computer 120 will be described below with reference to FIG. 9.

In step S900, the user inputs the information necessary for generating the task. More specifically, the user may access the application server 100 using the web browser 221 in the client computer 120 and transmits the information input by the user to the application server 100. When the user generates the printer driver install task, a screen is displayed on the web browser 221 for the user to input information about whether it is necessary to detect the change in the printer driver. FIG. 10 illustrates such a screen to be described in detail below. Upon receiving the input information transmitted from the user, the UI module 211 calls the printer driver management module 270.

In step S901, the printer driver management module 270 generates the task information based on the received input information. The task information includes information about task execution, such as the task ID that uniquely identifies the task and the execution time of the task, and information about the target device (e.g., MFP 150), the client computer 120, and the printer driver to be installed. The information about the printer driver to be installed includes the information about whether it is necessary to detect the change in each printer driver, generated based on the information input by the user on the screen illustrated in FIG. 10.

In step S902, the printer driver management module 270 stores the task information generated in step S901 in the task table 300 and the task object printer driver table 311 in the database service 219. In step S903, the printer driver management module 270 acquires from the task object printer driver table 311 in the database service 219, the information about the printer driver to be installed in the task.

The printer driver management module 270 then performs the processes of step S904 to step S908 for each printer driver to be processed in the present task. In step S904, the printer driver management module 270 determines whether the printer driver includes the signature, based on the printer driver information acquired in step S903. If the printer driver includes the signature (YES in step S904), the process proceeds to step S907. If the printer driver does not include the signature (NO in step S904), the process proceeds to step S905.

In step S905, the printer driver management module 270 determines whether the printer driver includes the EULA, based on the printer driver information acquired in step S903. If the printer driver includes the EULA (YES in step S905), the process proceeds to step S907. If the printer driver does not include the EULA (NO in step S905), the process proceeds to step S906.

In step S906, the printer driver management module 270 determines whether the printer driver is set to detect the change. Such a setting is specified via the screen illustrated in FIG. 10. If the printer driver is set to detect the change (YES in step S906), the process proceeds to step S907. If the printer driver is not set to detect the change (NO in step S906), the printer driver management module 270 performs the process of step S904 for the next printer driver.

In step S907, the printer driver management module 270 acquires the change detection information from the printer driver file. According to the present exemplary embodiment, the printer driver management module 270 acquires the hash value in the printer driver file as the change detection information. The change detection information may be any information by which a change in the printer driver can be detected, such as the hash value of the EULA included in the printer driver or the time stamp of the printer driver file.

In step S908, the printer driver management module 270 stores in the task object printer driver table 311 in the database service 219, the hash value of the printer driver file acquired in step S907. After the printer driver management module 270 performs the processes of step S904 to step S908 for all printer drivers, i.e., the objects of the task to be generated, the operation performed by the application server 100 illustrated in FIG. 9 ends.

An example of a screen which is displayed in response to the process performed in step S900 illustrated in FIG. 9 will be described in detail below with reference to FIG. 10. Referring to FIG. 10, a check box 1000 is used for setting whether to detect the change when the task is to be executed. Control performed using radio buttons 1001 and 1002 and a task object printer driver list 1003, i.e., sub-setting items, becomes valid only when the check box 1000 has been checked.

More specifically, the radio button 1001 may be used to set detection of the change to be performed in all task printer drivers. The radio button 1002 is used to set detection of the change to be performed only in the task printer driver selected by the user. The radio buttons 1001 and 1002 are in pairs, and if either radio button is checked, the other radio button becomes unchecked. The control performed using the task object printer driver list 1003 becomes valid only when either of the radio button 1001 or the radio button 1002 has been checked. The task object printer driver list 1003 displays a list of the task object printer drivers selected by the user in the previous task generation step.

The task object printer driver list 1003 includes a check box column 1004, a PDL column 1005, a printer version column 1006, a supported OS column 1007, a language column 1008, a signature/no signature column 1009, and an EULA display button column 1010. The task object printer driver list 1003 displays the information about each printer driver, and the EULA display button becomes valid in the EULA display button column 1010 only when the printer driver includes the EULA. If the user clicks the EULA display button, the content of the EULA is displayed on a separate screen. Further, if the printer driver includes either the signature or the EULA, the check box in the check box column 1004 remains checked, and becomes unable to be selected by the user. In other words, if the printer driver includes either the signature or the EULA, change detection becomes set to the printer driver, without being selected by the user.

If the user clicks a back button 1011, the screen shifts to a screen indicating a step immediately before generating the install task. If the user clicks a next button 1012, the screen shifts to a screen indicating a step immediately after generating the install task. If the user presses a cancel button 1013, the install task generation ends.

If the user clicks the next button 1012 and finalizes task registration, the selected statuses in the screen illustrated in FIG. 10 is transmitted to the application server 100 as information necessary for generating the task. If the check box 1000 and the radio button 1001 are checked, the printer driver management module 270 sets the information on whether change detection is necessary so that the change is detected in all printer drivers when executing the task. On the other hand, if the check box 1000 and the radio button 1002 are checked, the printer driver management module 270 sets the information on whether change detection is necessary only to printer drivers checked in the check box column 1004 in the task object printer driver list 1003. The change is thus detected only in the checked printer drivers when executing the task. If the check box 1000 is not checked, the printer driver management module 270 sets the information on whether change detection is necessary so that the change is not detected in any of the printer driver when executing the task.

The operation performed by the application server 100 when executing the task will be described below with reference to FIG. 11. According to the present exemplary embodiment, a task for installing the printer driver to the client computer 120 will be described as an example of the task executed by the application server 100.

In step S1100, the task management module 217 acquires the task information about the printer driver install task from the task table 300 in the database service 219 and calls the printer driver management module 270. In step S1101, the printer driver management module 270 acquires from the task object printer driver table 311 in the database service 219, the information about the printer driver to be installed in the task. The printer driver information to be acquired includes the information about whether to detect the change when the task is to be executed.

The printer driver management module 270 then performs for each printer driver to be installed in the task, the processes of step S1102 to step S1104. In step S1102, the printer driver management module 270 determines whether it is necessary to detect the change, based on the information about whether it is necessary to detect the change, included in the acquired printer driver information. If it is necessary to detect the change (YES in step S1102), the process proceeds to step S1103. If it is not necessary to detect the change (NO in step S1102), the printer driver management module 270 performs the process of step S1102 for the next printer driver.

In step S1103, the printer driver management module 270 detects whether the printer driver to be installed in the task has been changed, base on the printer driver information acquired in step S1101. The change is detected by, for example, comparing the hash value of the printer driver when the task is generated, included in the printer driver information acquired in step S1101, with the hash value of the printer driver when the task is to be executed. The change may be detected by any method as long as whether the printer driver has been changed can be detected. In step S1104, the printer driver management module 270 determines whether the printer driver has been changed, based on the detection result acquired in step S1103. If the printer driver has been changed (YES in step S1104), the process ends without executing the task.

Cases where the printer driver is changed between generation of the task and execution of the task are, for example, when the printer driver file archived in the archive module 218 has been altered or destructed, and when the printer driver is updated due to a version upgrading or a setting change. Control may thus be separately performed for each case. For example, if the printer driver file has been altered or destructed, task execution is disrupted. However, if the printer driver is updated due to a version upgrading or a setting change, the task is executed. Further, if task execution is cancelled, the task may be easily re-executed by the printer driver management module 270 generating a recovery task, and the user re-editing the task information. For example, if the task execution is disrupted by updating due to a version upgrading or a setting change, the recovery task edit screen may display that the printer driver has been upgraded or the setting information of the printer driver has been changed.

If it is determined that there is no change in the printer driver (NO in step S1104), the printer driver management module 270 performs the process of step S1102 for the next printer driver. If the printer driver management module 270 has performed the processes of step S1102 to step S1104 for all printer drivers to be installed in the task, the process proceeds to step S1105.

In step S1105, the printer driver management module 270 acquires the registered printer driver file via the archive module 218. The printer driver management module 270 then executes the task for installing the acquired printer driver to the client computer 120. More specifically, the printer driver management module 270 may transmit to the client computer 120, the printer driver file and an instruction to install the printer driver file, and causes the printer driver agent 280 to install the printer driver.

As described above, according to the present exemplary embodiment, whether to detect the change in the object when executing the task is determined according to the setting of the object to be processed in the task (e.g., the printer driver).

As a result, the present exemplary embodiment prevents the printer driver that has been changed against the intentions of a network administrator or the user, from becoming installed in the client computer 120. Further, when the user generates the task, the user is caused to select for each printer driver used in executing the task, whether to detect the change when the task is to be executed. The operation performed when executing the task can thus be switched according to the result of user selection.

Furthermore, according to the second exemplary embodiment, the printer driver has been described as an example. However, a process similar to that in the present exemplary embodiment may be applied to a task for distributing a resource file to the MFP. More specifically, there may be a case where the signature information is set to the resource file, or the administrator may desire to set on a screen similar to the screen illustrated in FIG. 10, detecting a change in a specific resource file. In such a case, the resource file which has been changed against the intentions of the network administrator can be prevented from becoming distributed.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-096332 filed Apr. 19, 2010, which is hereby incorporated by reference herein in its entirety.

What is claimed is:

1. A management apparatus comprising:
a storing unit configured to store, when generating a task in which an object, a network device to which the object is to be transmitted, and an execution time of the task are set, information about the object to be processed in the task, on a database service;
a transmission unit configured to transmit, at an execution time set in a first task for which a detection of a change in information about an object is not required, the object to be processed in the first task by executing the first task to the network device set in the first task;
a detection unit configured to detect, at an execution time set in a second task different from the first task, whether information about an object to be processed in the second task is changed from the information about the object stored in the storing unit when the second task is generated, according to a setting of the second task or the object to be processed in the second task; and
a cancelling unit configured to cancel, when the detection unit detects that there is a change in the information about the object, execution of the second task,
wherein the transmission unit is configured to transmit, when the detection unit detects that there is no change in the information about the object, the object to be processed in the second task by executing the task, to the network device set in the second task.

2. The management apparatus according to claim 1, wherein the second task is set to install an application to a network.

3. The management apparatus according to claim 1, wherein a license agreement file or signature information is set to the object to be processed in the second task.

4. The management apparatus according to claim 1, wherein the object to be processed in the second task is set so that it is necessary for a user to detect an alteration.

5. The management apparatus according to claim 1, wherein the first task is set to transmit to the network device a destination table or a resource file.

6. The management apparatus according to claim 1, wherein the information about the object is at least one of a hash value of the object, a hash value of a license agreement file corresponding to the object, and a time stamp of the object.

7. The management apparatus according to claim 1, wherein the network device includes at least one of an image forming apparatus and a client computer.

8. The management apparatus according to claim 1, further comprising a providing unit configured to provide an execution status of the generated task.

9. The management apparatus according to claim 1, wherein the detection unit detects a change in information about the object when at least one of an object alteration, destruction, or updating due to a version upgrading is performed.

10. The management apparatus according to claim 1, further comprising a control unit configured to cause, if a change detected by the detection unit is not caused by an updating due to a version upgrading of the object, the canceling unit to cancel execution of the second task, and to display, if the change is caused by an updating due to a version upgrading of the object, a screen for newly generating a task to process the updated object.

11. A control method comprising:
storing, when generating a task in which an object, a network device to which the object is to be transmitted, and an execution time of the task are set, information about the object to be processed in the task, on a database service;
transmitting, at an execution time set in a first task for which a detection of a change in information about an object is not required, the object to be processed in the first task by executing the first task to the network device set in the first task;
detecting, at an execution time set in a second task different from the first task, whether information about an object to be processed in the second task is changed from the information about the object stored in the storing unit when the second task is generated, according to a setting of the second task or the object to be processed in the second task; and
canceling, when the detection unit detects that there is a change in the information about the object, execution of the second task,
wherein the transmitting step transmits, when the detecting step detects that there is no change in the information about the object, the object to be processed in the second task by executing the task, to the network device set in the second task.

12. The control method according to claim 11, wherein the second task is set to install an application to a network.

13. The control method according to claim 11, wherein a license agreement file or signature information is set to the object to be processed in the second task.

14. The control method according to claim 11, wherein the object to be processed in the second task is set so that it is necessary for a user to detect an alteration.

15. The control method according to claim 11, wherein the first task is set to transmit to the network device a destination table or a resource file.

16. The control method according to claim 11, wherein the information about the object is at least one of a hash value of the object, a hash value of a license agreement file corresponding to the object, and a time stamp of the object.

17. The control method according to claim 11, wherein the network device includes at least one of an image forming apparatus and a client computer.

18. The control method according to claim 11, further comprising providing an execution status of the generated task.

19. The management apparatus according to claim 11, wherein the detecting step detects a change in information about the object when at least one of an object alteration, destruction, or updating due to a version upgrading is performed.

20. The management apparatus according to claim 11, further comprising causing, if a change detected by the detecting step is not caused by an updating due to a version upgrading of the object, the cancelling step to cancel execution of the second task, and to display, if the change is caused by an updating due to a version upgrading of the object, a screen for newly generating a task to process the updated object.

21. A non-transitory computer-readable storage medium storing a computer program for causing a computer to execute a method for a management apparatus, the method comprising:

storing, when generating a task in which an object, a network device to which the object is to be transmitted, and an execution time of the task are set, information about the object to be processed in the task, on a database service;

transmitting, at an execution time set in a first task for which a detection of a change in information about an object is not required, the object to be processed in the first task by executing the first task to the network device set in the first task;

detecting, at an execution time set in a second task different from the first task, whether information about an object to be processed in the second task is changed from the information about the object stored in the storing unit when the second task is generated, according to a setting of the second task or the object to be processed in the second task; and canceling, when the detection unit detects that there is a change in the information about the object, execution of the second task, wherein the transmitting step transmits, when the detecting step detects that there is no change in the information about the object, the object to be processed in the second task by executing the task, to the network device set in the second task.

* * * * *